WEST & PAUL.
Cultivator-Teeth.

No. 69,731.

Patented Oct. 8, 1867.

Witnesses:
J. Alison Fraser
Wm Trewin

Inventor:
R. West
H. F. Paul
Per Munn & Co.
Attys

United States Patent Office.

R. WEST AND H. F. PAUL, OF CONCORD, NEW HAMPSHIRE.

Letters Patent No. 69,731, dated October 8, 1867.

---

IMPROVEMENT IN CULTIVATOR AND HARROW-TOOTH.

---

*The Schedule referred to in these Letters Patent and making part of the same.*

---

TO ALL WHOM IT MAY CONCERN:

Be it known that we, R. WEST and H. F. PAUL, of Concord, in the county of Merrimack, and State of New Hampshire, have invented a new and improved Cultivator, or Harrow-Tooth; and we do hereby declare that the following is a full, clear, and exact description thereof, which will enable others skilled in the art to make and use the same, reference being had to the accompanying drawings forming part of this specification.

Similar letters of reference indicate corresponding parts.

This invention relates to a new manner of shaping the flaring wings of cultivator or harrow-teeth, and consists in arranging the upper ends of the wings open at the rear of the main part of the tooth, so that the surface soil will fall to the bottom between the teeth, and will thereby also cover the track of the tooth, leaving no furrow. The invention also consists in making the said wings removable, so that they can be replaced whenever desired, and when worn out.

Figure 1:
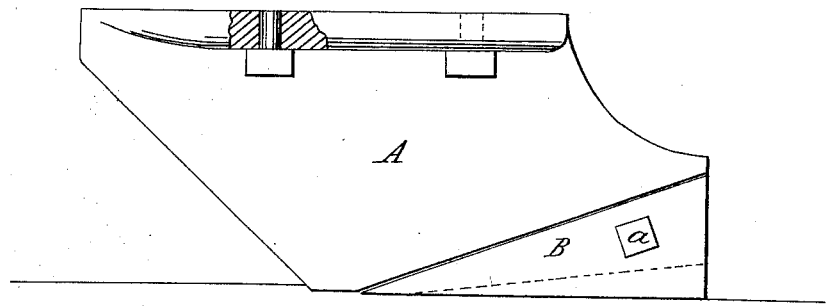
Figure 1 represents a side elevation of our invention.
Figure 2:
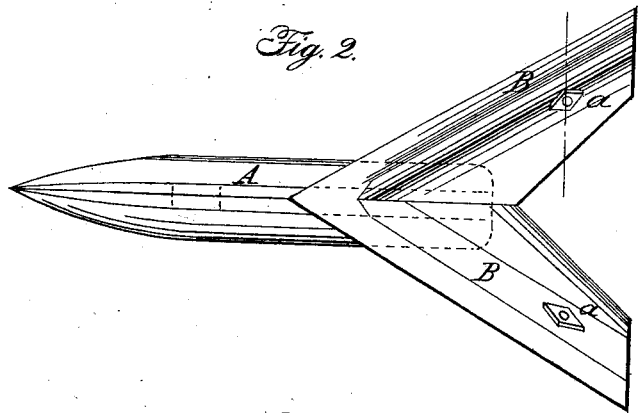
Figure 2 is an inverted plan view of the same.
Figure 3:
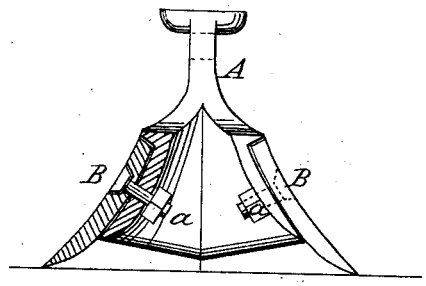
Figure 3 is a rear elevation, partly in section, of the same.

A represents the body of a harrow-tooth. Its front edge is inclined, as shown in fig. 1, so as to cut easily through the soil. Towards the rear the lower part of the tooth is gradually spread out, as shown in fig. 2, thereby forming two wings, B B. The whole rear part of the tooth is not solid, but the wings have only the thickness necessary to make them strong enough. A triangular space is thus formed between the wings, which is left open on top, by cutting down the upper edge of the tooth at its rear end, as is clearly shown in figs. 1 and 3. By this arrangement the surface soil raised by the tooth, on its flaring wings, will fall over the upper edges of the wings into the space left between the same, and will thereby be brought to the bottom, whereby the soil is not only thoroughly turned over, but whereby also the furrow made by the tooth is covered up. The wings B can be secured by bolts $a$ $a$, or otherwise, to the main part of the tooth A, so that they can be removed from the same whenever desired, and can be renewed when worn.

We do not claim constructing a harrow or cultivator-tooth with two shares or wings, nor do we claim bringing the top of the wings together at any certain part of the main tooth, but we do claim, and desire to secure by Letters Patent—

1. Extending the flaring parts or the wings of a cultivator or harrow-tooth back, beyond the rear edge of the body of the tooth, and having the space between the said wings open on top, to allow the surface soil to fall over the edges of the wings into the furrow made by the tooth, substantially as herein shown and described.

2. Having the wings B B of a cultivator or harrow-tooth removable from the body A of the tooth, substantially as and for the purpose herein shown and described.

R. WEST,
H. F. PAUL.

Witnesses:
C. C. WEBSTER,
DAVID L. NEAL.